(12) United States Patent
Omanovic et al.

(10) Patent No.: US 12,233,713 B2
(45) Date of Patent: Feb. 25, 2025

(54) HUD PARK ASSIST

(71) Applicant: Panasonic Automotive Systems Company of America, Division of Panasonic Corporation of North America, Peachtree City, GA (US)

(72) Inventors: Edo Omanovic, Livonia, MI (US); Robert Napier, Walled Lake, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 1211 days.

(21) Appl. No.: 16/592,418

(22) Filed: Oct. 3, 2019

(65) Prior Publication Data

US 2020/0108721 A1    Apr. 9, 2020

Related U.S. Application Data

(60) Provisional application No. 62/741,720, filed on Oct. 5, 2018.

(51) Int. Cl.
| | | |
|---|---|---|
| *B60K 35/00* | (2024.01) | |
| *B60K 35/10* | (2024.01) | |
| *B60K 35/23* | (2024.01) | |
| *B60K 35/28* | (2024.01) | |
| *B60W 40/08* | (2012.01) | |
| *G02B 27/01* | (2006.01) | |

(52) U.S. Cl.
CPC ............ *B60K 35/00* (2013.01); *B60W 40/08* (2013.01); *G02B 27/0179* (2013.01); *B60K 35/10* (2024.01); *B60K 35/23* (2024.01); *B60K 35/28* (2024.01); *B60K 2360/149* (2024.01); *B60K 2360/176* (2024.01); *B60W 2554/00* (2020.02); *G02B 2027/0181* (2013.01)

(58) Field of Classification Search
CPC ...... B60K 2370/149; B60K 2370/1529; B60K 2370/176; B60K 2370/177; B60K 2370/193; B60K 2370/21; B60K 35/00; B60W 2040/0872; B60W 2554/00; B60W 40/08; G02B 2027/0123; G02B 2027/0138; G02B 2027/014; G02B 2027/0181; G02B 2027/0183; G02B 2027/0187; G02B 27/01
See application file for complete search history.

(56) References Cited

U.S. PATENT DOCUMENTS

| | | | | |
|---|---|---|---|---|
| 7,359,782 | B2* | 4/2008 | Breed | G01S 17/931 |
| | | | | 710/48 |
| 2013/0038732 | A1* | 2/2013 | Waite | B60R 1/00 |
| | | | | 348/148 |
| 2015/0360565 | A1* | 12/2015 | Goto | B60R 1/00 |
| | | | | 701/36 |
| 2019/0315275 | A1* | 10/2019 | Kim | B60J 1/02 |

\* cited by examiner

*Primary Examiner* — Charles J Han
(74) *Attorney, Agent, or Firm* — Laurence S. Roach, Esq.

(57) ABSTRACT

A head up display arrangement is for a motor vehicle having a human driver. The arrangement includes a camera positioned and configured to capture images of a space in front of the vehicle. At least a portion of the space is blocked from view of the driver by a part of the vehicle. A head up display module produces virtual images that are visible to the driver. The virtual images are based on the images captured by the camera.

8 Claims, 4 Drawing Sheets

HUD PARK ASSIST

CROSS-REFERENCED TO RELATED APPLICATIONS

This application claims benefit of U.S. Provisional Application No. 62/741,720, filed on Oct. 5, 2018, the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

SUMMARY

The present invention may enable the use of a Head Up Display (HUD) to provide the driver with help in parking their vehicle. Displayed on the HUD may be an image captured by a front camera, enabling the driver to see what is directly in front of the vehicle when normally the hood of the vehicle would block their field of view.

In one embodiment, the invention comprises a head up display arrangement for a motor vehicle having a human driver. The arrangement includes a camera positioned and configured to capture images of a space in front of the vehicle. At least a portion of the space is blocked from view of the driver by a part of the vehicle. A head up display module produces virtual images that are visible to the driver. The virtual images are based on the images captured by the camera.

In another embodiment, the invention comprises a head up display method for a motor vehicle having a driver. Images of a space in front of the vehicle are captured. At least a portion of the space is blocked from view of the driver by a part of the vehicle. Virtual images that are visible to the driver are produced. The virtual images are based on the captured images.

In yet another embodiment, the invention comprises a head up display arrangement for a motor vehicle having a human driver. A camera is positioned and configured to capture images of a space in front of the vehicle. At least a portion of the space is blocked from view of the driver by a part of the vehicle. A collision sensor detects an increased probability of a collision between the vehicle and an obstacle that is disposed within the space. A head up display module operates in either a first mode or a second mode. In the first mode the head up display module produces first virtual images that are visible to the driver. The first virtual images are independent of the images captured by the camera. In the second mode the head up display module produces second virtual images that are visible to the driver. The second virtual images are dependent upon the images captured by the camera. The head up display module switches from the first mode to the second mode in response to receiving a signal from the collision sensor indicative of the increased probability of a collision between the vehicle and the obstacle that is disposed within the space.

An advantage of the present invention is that it makes it very easy to park large trucks in tight spaces without making any contact with an obstacle, such as a wall, another vehicle, etc.

Another advantage is that the invention provides the driver with a unique perspective to see what is in front of the car without having to take their eyes off of the road. Other products could potentially show the same information on a display, but that would require the driver to take their eyes off the road, as well as off of the windshield. More particularly, using the cluster or center stack, the video feed from a front mounted camera could potentially be shown to the driver so they could see the same information. This would require the driver to take their eyes off the road and pay attention to the display, which could be hazardous. With the present invention, the driver may see the virtual images that are based on the images captured by the front camera by looking in the direction of the windshield, which is closer to the direction of looking at the road than is the direction of looking at the cluster or center stack.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figures 1, 2:
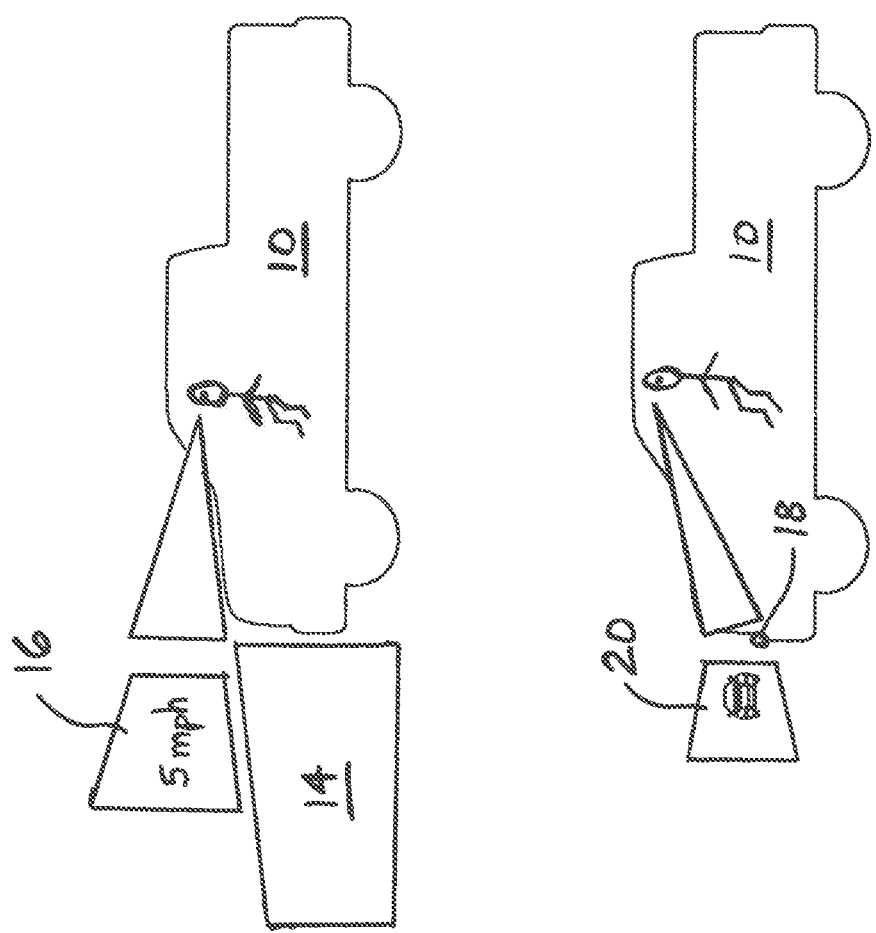
FIG. 1 is a schematic side view of one embodiment of a truck attempting to part adjacent to a car while in a prior art mode of operation.
FIG. 2 is a schematic side view of the truck of FIG. 1 including a HUD park assist arrangement of the present invention attempting to part adjacent to a car while in a HUD park assist mode of operation of the present invention.

FIGS. 1-2 illustrate two scenarios, one scenario (FIG. 1) with a truck 10 in a known normal mode of operation of the prior art (i.e., HUD with no park assist) and the other scenario (FIG. 2) with truck 10 in a HUD Park Assist mode of operation of the present invention. In the FIG. 1 scenario, truck 10 is approaching a car 12 in order to park adjacent to car 12. A space 14 in front of truck 10 is not visible to the truck driver because the hood of truck 10 blocks the driver's view. The HUD of truck 10 indicates to the truck driver only that the speed of truck 10 is five miles per hour, as indicated at 16. In contrast, in the FIG. 2 scenario, as truck 10 approaches car 12 in order to park adjacent to car 12, a camera 18 mounted on a front edge of truck 10 provides a HUD image of car 12 to the truck driver, as indicated at 20.

A HUD Park Assist Arrangement (not shown) of the present invention disposed within truck 10 may enable the driver of truck 10 to turn ON/OFF the Park Assist feature in their HUD. Turning on the Park Assist feature may automatically move the virtual image below the hood line as viewed by the driver. The virtual image is still visible even though it is below the hood line, and, since the virtual image is at a distance, it appears to the driver as if he is seeing through the hood of the truck. The inventive Park Assist feature may be used in a car as well, but the benefits may be enhanced with a truck due to the relatively greater ride height of a truck. From the front mounted camera, video may be fed to the HUD which may provide the driver with an image of what is directly in front of the truck. Image processing may be performed to either provide the entire image to the driver or only that portion of the image that would be directly visible at these particular angles. That is, the driver may only see one side of the car since the HUD image would not be able to encompass the entire car. Front proximity sensors (not shown) may be used to automatically trigger the inventive Park Assist mode as part of a driver awareness safety feature. A driver may be notified of an impending collision and the HUD may show the driver what would otherwise be hidden from their field of view by the hood.

Figure 3:
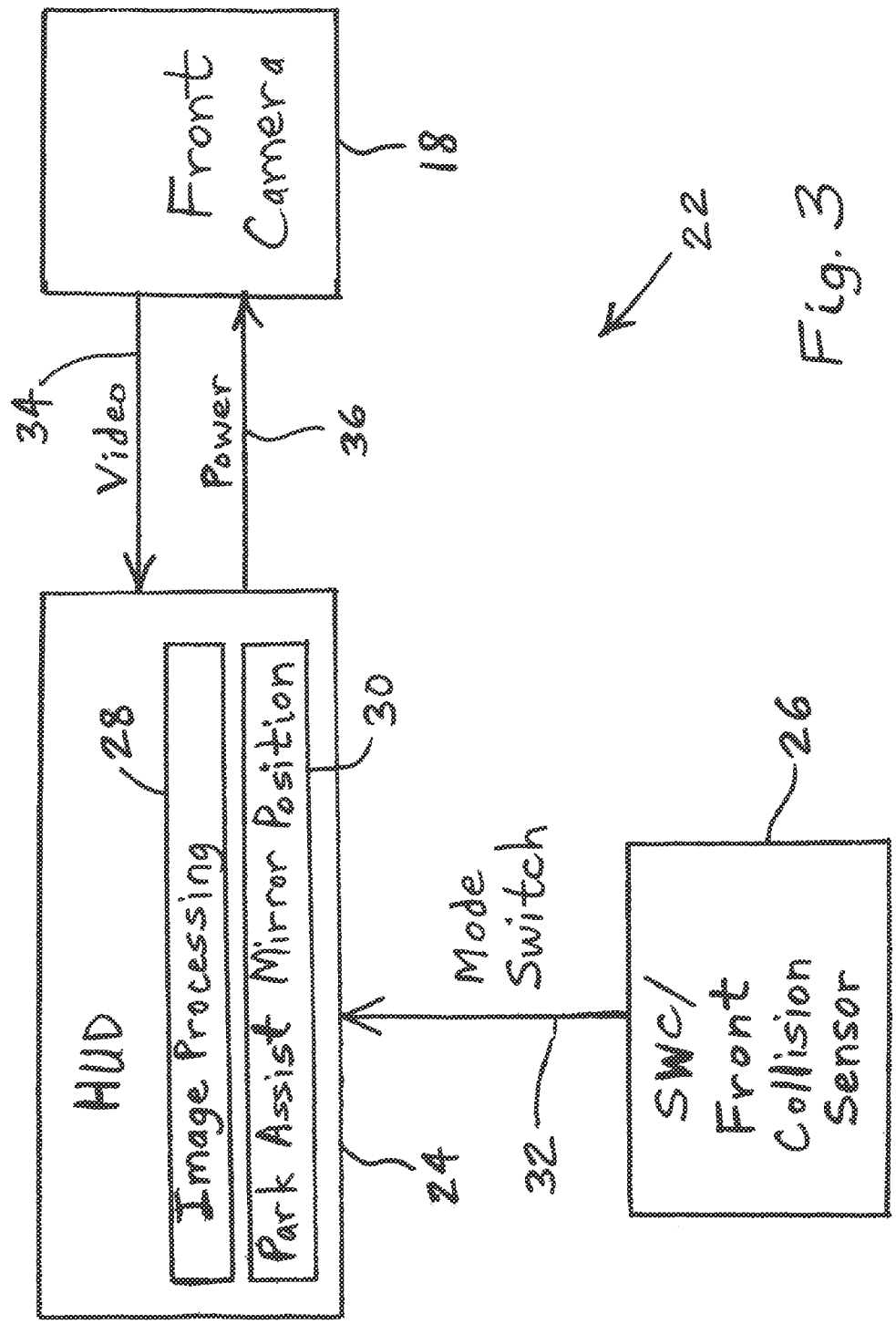
FIG. 3 is a block diagram of one embodiment of an automotive head up display park assist arrangement of the present invention, such as for use in the truck of FIG. 2.

FIG. 3 illustrates one embodiment of an automotive head up display park assist arrangement 22 of the present invention, such as for use in truck 10. Arrangement 22 includes front camera 18, a HUD module 24, and a steering wheel control (SWC)/front collision sensor 26. HUD module 24 includes an image processing block 28 and a park assist mirror positioning block 30.

During use, front collision sensor 26 may detect that truck 10 is within a threshold distance of some obstacle, such as car 12. In response to detecting that truck 10 is within the threshold distance of the obstacle, sensor 26 may transmit a mode switch signal 32 to HUD module 24. Transmission of mode switch signal 32 may depend upon the velocity and/or acceleration of truck 10 as well as the distance between truck and the obstacle. In response to receiving mode switch signal 32, HUD module 24 may switch from the conventional mode to the HUD park assist mode in which images captured by front camera 18 are presented to the truck driver as virtual images. Images captured by front camera 18 may be transmitted to HUD module 24 as video signals 34, and electrical power may be provided by HUD module 24 to camera 18, as indicated at 36.

Park Assist Mirror Positioning block 30 may orient the HUD mirrors such that the virtual image appears to the truck driver to be in the direction in which the field of view of camera 18 is aligned. Thus, the driver may effectively see through the hood of truck 10, and the driver may see the obstacle by looking in the same direction that he would if the hood were not there.

Figure 4:
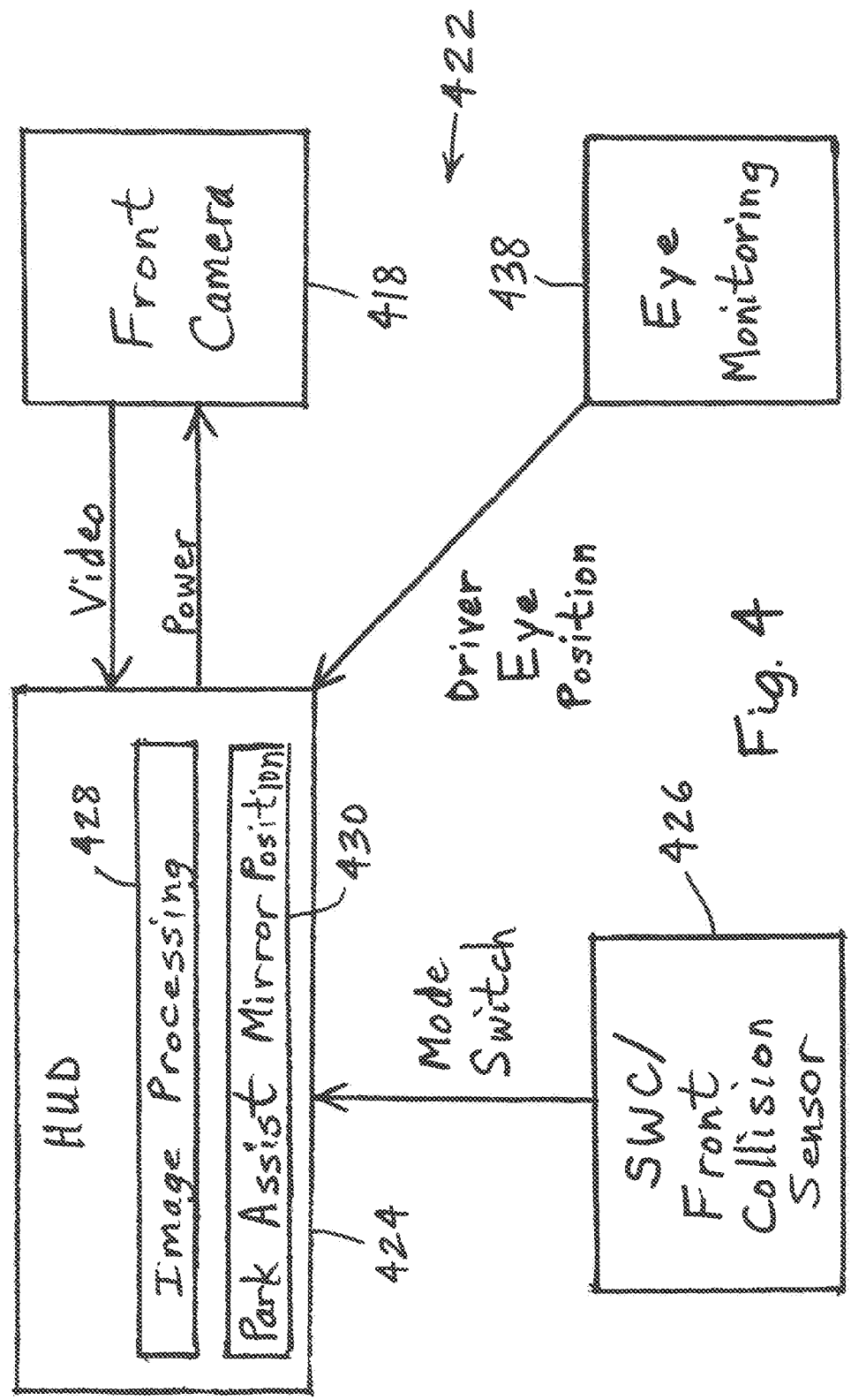
FIG. 4 is a block diagram of another embodiment of an automotive head up display park assist arrangement of the present invention, such as for use in the truck of FIG. 2.

FIG. 4 illustrates another embodiment of an automotive head up display park assist arrangement 422 of the present invention, such as for use in truck 10. Arrangement 422 includes front camera 418, a HUD module 424, a steering wheel control (SWC)/front collision sensor 426, and a driver's eyes monitoring module 438, which may include a camera capturing images of the driver's head. HUD module 424 includes an image processing block 428 and a park assist mirror positioning block 430.

During use, the driver monitoring camera of module 438 may detect the position of the driver's eyes and may modify the virtual image depending on the position of the driver's eyes. For example, in response to detecting that the driver has tilted their head to the left, camera 418 may be pointed in a more rightward direction in order to simulate the driver's viewpoint with their head tilted to the left. Similarly, in response to detecting that the driver has tilted their head to the right, camera 418 may be pointed in a more leftward direction in order to simulate the driver's viewpoint with their head tilted to the right. Instead of moving the orientation of camera 418 in response to the driver's head movement, it is also possible to electronically process the virtual image to thereby modify the viewpoint of the virtual image while leaving camera 418 stationary. Other features of arrangement 422 may be substantially similar to those of arrangement 22, and thus are not described in detail herein in order to avoid needless repetition.

Figure 5:
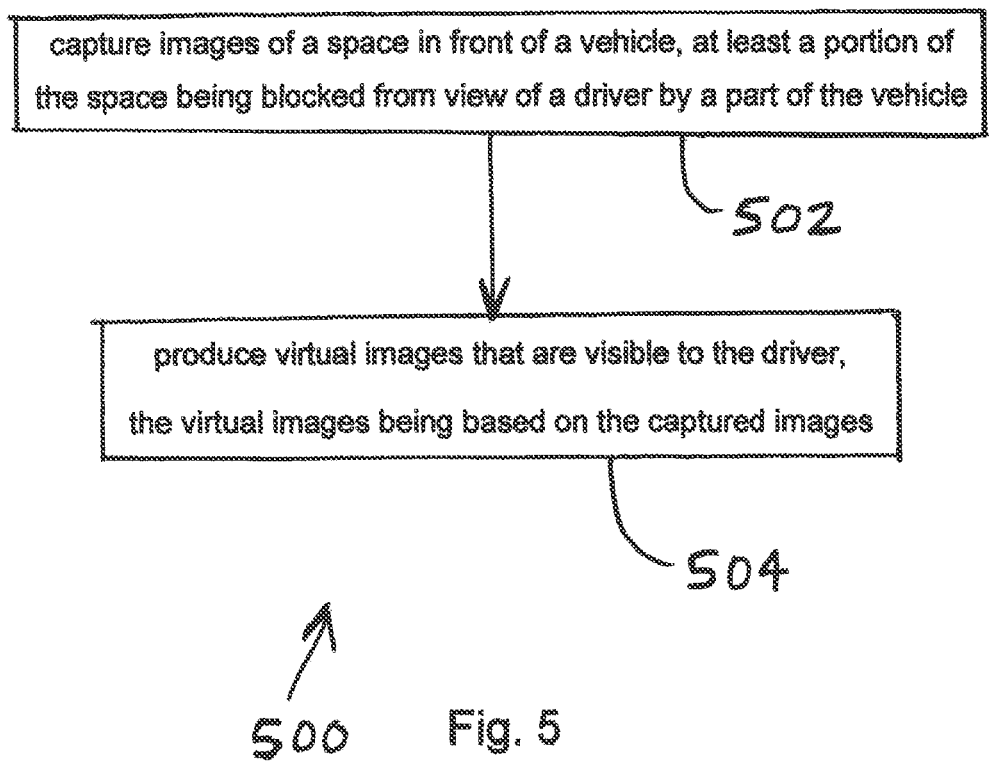
FIG. 5 is a flow chart of one embodiment of a head up display method 500 for a motor vehicle having a driver.

FIG. 5 illustrates one embodiment of a head up display method 500 for a motor vehicle having a driver. In a first step 502, images of a space in front of the vehicle are captured. At least a portion of the space is blocked from view of the driver by a part of the vehicle. For example, front camera 18 may capture images of a space in front of truck 10. As shown in FIG. 2, a portion of the space is blocked from view of the driver by a hood of truck 10. However, the images captured by camera 18 may include the portion of the space that is blocked from view of the driver by the hood of truck 10.

In a final step 504, virtual images that are visible to the driver are produced. The virtual images are based on the captured images. For example, based on images captured by camera 18, a HUD virtual image of car 12 is presented to the truck driver, as indicated at 20.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle having a human driver, comprising:
   a camera positioned and configured to capture images of a space in front of the vehicle, the space being blocked from view of the driver by a hood of the vehicle;
   a collision sensor configured to detect a state wherein a collision between the vehicle and an obstacle that is disposed within the space could potentially occur, the obstacle being blocked from view of the driver by the hood of the vehicle; and
   a head up display configured to operate in either a first mode or a second mode, in the first mode the head up display producing first virtual images that are visible to the driver, the first virtual images being independent of the images captured by the camera, in the second mode the head up display producing second virtual images that are visible to the driver, the second virtual images being dependent upon the images captured by the camera, the second virtual images being below a hood line of the motor vehicle as viewed by the driver, the head up display being configured to switch from the first mode to the second mode in response to receiving a signal from the collision sensor indicative of a state wherein a collision between the vehicle and the obstacle that is disposed within the space could potentially occur, wherein the second virtual images are presented to the driver only if the vehicle is in a drive gear such that the vehicle is configured to move in a forward direction, and wherein the second virtual images are substantially aligned with an eye of the driver and the obstacle that is disposed within the space that is blocked from view of the driver by the hood of the vehicle.

2. The head up display arrangement of claim 1 wherein the head up display is configured to produce the virtual images in a direction from the driver's eyes that substantially matches a direction from the driver's eyes to the space, and that substantially matches a direction from the driver's eyes to the hood of the vehicle that blocks the driver's view of the space.

3. The head up display arrangement of claim 1 wherein the virtual images based on the images captured by the camera are presented to the driver only if the collision sensor detects that the motor vehicle is within a threshold distance of the obstacle.

4. The head up display arrangement of claim 3 wherein the virtual images based on the images captured by the camera are presented to the driver only if a velocity of the vehicle indicates a state wherein a collision between the vehicle and the obstacle could potentially occur.

5. The head up display arrangement of claim 1 further comprising a driver's eye monitoring module configured to detect a position of an eye of the driver, the head up display being configured to modify a field of view of the camera based upon the detected position of the eye of the driver.

6. The head up display arrangement of claim 1 further comprising a driver's eye monitoring module configured to detect a position of an eye of the driver, the head up display being configured to electronically modify a viewpoint of the virtual images by use of video processing, the modifying being based upon the detected position of the eye of the driver.

7. The head up display arrangement of claim 1 wherein the head up display is configured to switch between the first mode and the second mode in response to a command from the human driver.

8. The head up display arrangement of claim 1 wherein the head up display includes at least one mirror configured to reflect light fields and thereby direct the first virtual images and the second virtual images, the head up display being configured to orient the at least one mirror such that the virtual image appears to the human driver to be in a direction in which a field of view of the camera is aligned, such that the human driver may effectively see through the hood of the vehicle, and such that the driver may see the obstacle by looking in the same direction that he would need to if the hood were not there, and to thereby show the human driver what would otherwise be hidden from their field of view by the hood.

* * * * *